INVENTOR
MILTON BERNARD HOLLANDER

United States Patent Office 3,473,214
Patented Oct. 21, 1969

3,473,214
FRICTION WELDING
Milton Bernard Hollander, Stamford, Conn., assignor, by mesne assignments, to Caterpillar Tractor Co., Peoria, Ill., a corporation of California
Filed July 10, 1963, Ser. No. 293,932
Int. Cl. B23k 27/00
U.S. Cl. 29—470.3     5 Claims

ABSTRACT OF THE DISCLOSURE

The process involves friction welding titanium and titanium alloy workpieces by rapidly heating the workpieces and rapidly stopping the relative rotation of the workpieces.

---

This invention relates in general to friction welding, and, more particularly, to the friction welding of titanium and titanium alloy workpieces.

Commercially pure titanium, and titanium alloy containing from 4% to 8% aluminum and from 3% to 5% vanadium are used in air and space craft, for example, in rocket motors and as structural elements because titanium and its alloys exhibit great strength and retain such strength at high temperatures. These materials are also used in atomic reactors for the same reasons. Thus methods of working and fabricating structures and elements of titanium and titanium alloy find many immediate uses in these areas.

Figure 1:
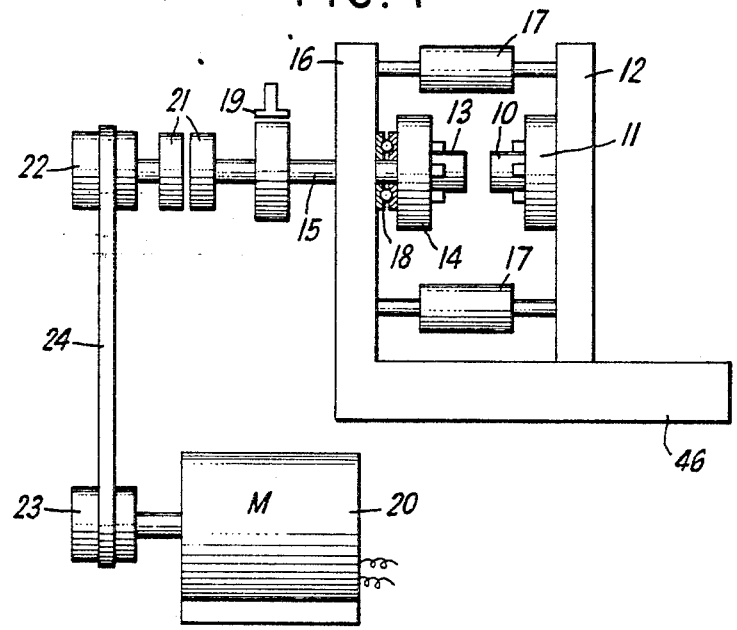
Figure 2:
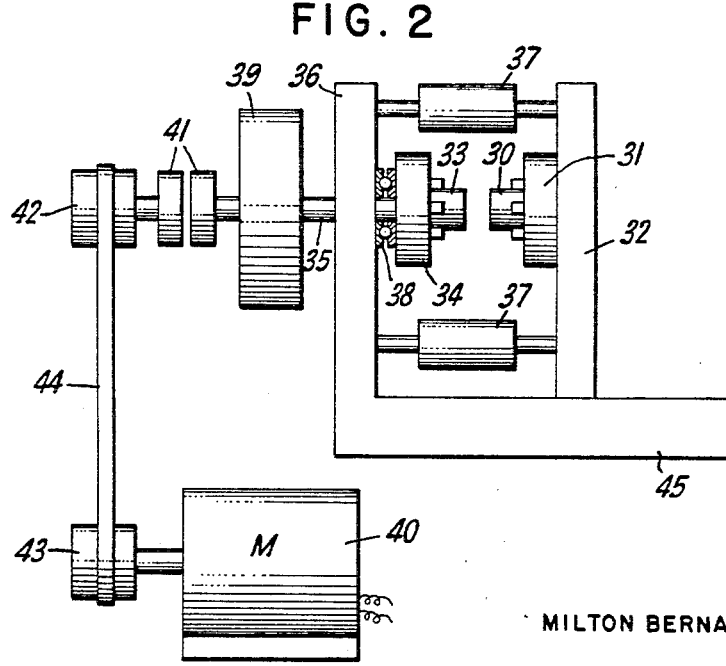

A main object of this invention is to provide a method for friction welding titanium and titanium alloy workpieces to each other and in combinations with each other. This and other objects, advantages and features of the invention will become apparent from the following description and accompanying drawing wherein:

FIGURE 1 is a schematic drawing of a conventional friction welding apparatus; and FIGURE 2 is a schematic drawing of an inertia friction welding apparatus.

FIGURE 1 shows a conventional friction welding apparatus in which a first workpiece 10 is held in the stationary chuck 11 which is fixed to a vertical frame member 12 slidably mounted on base 46. A second workpiece 13 is placed in a rotatably mounted chuck 14 which is fixed on a shaft 15. Shaft 15 passes through the stationary vertical member 16 on base 46. Hydraulic cylinders 17 are connected between the members 12 and 16 to draw them together when the cylinders 17 are activated. A thrust bearing 18 takes up the axial load from the rotating chuck 14. A friction brake 19 is mounted on shaft 15 and is used to rapidly stop the rotation of chuck 14. Shaft 15 is driven by motor 20 through clutch 21 by means of the pulleys 22 and 23 and the belt 24.

FIGURE 2 shows a flywheel or inertia friction welding apparatus in which a first workpiece 30 is held in a stationary chuck 31 fixed to the slidably mounted vertical frame member 32 on base member 45. A second workpiece 33 is placed in a rotatably mounted chuck 34 which is fixed to a shaft 35 passing through a stationary vertical frame member 36 on base 45. Hydraulic cylinders 37 are connected between the members 32 and 36 to draw them together. A thrust bearing 38 takes the load from the rotating chuck 34. A flywheel 39 is fixed on shaft 35. Shaft 35 is driven by motor 40 through clutch 41 by means of the pulleys 42 and 43 and the belt 44.

To weld titanium and titanium alloy workpieces with the apparatus shown in FIGURES 1 or 2, about 5,500 foot pounds of energy must be delivered to the weld area for each square inch of weld area.

Titanium and titanium alloy workpieces 10 and 13, which are tubular in section having an outside diameter of ¾ inch, have been successfully friction welded using the apparatus shown in FIGURE 1. Workpiece 13 was rotated at a speed of 3,600 r.p.m. and the cylinders 17 were activated to hold the workpieces together with a rubbing pressure of 300 pounds per square inch for about six seconds. Brake 19 was then applied as clutch 21 was disengaged and the cylinders 17 were activated to force the workpieces 10 and 13 together with a forging pressure of 10,000 pounds per square inch. The forging pressure completed the weld forcing some plastic flow and form as upset between the workpieces as and after they stopped their relative rotation.

If the initial rubbing pressure were reduced to 100 pounds per square inch, the rubbing contact would have to be maintained for over ten seconds to put sufficient heat energy into the weld. If the initial pressure were increased to 1,500 pounds per square inch, it need only be maintained for about one second to put sufficient heat energy into the weld.

For best results, with the apparatus shown in FIGURE 1, a relative average surface speed of over two feet per second should be maintained between the workpieces. Slower relative sliding speed may result in chatter and the galling of the workpieces, rather than uniform heat generation. The forementioned values substantially hold true for larger and smaller workpieces.

Titanium and titanium alloy workpieces 30 and 33 which were ¾ inch diameter rods were friction welded with the apparatus shown in FIGURE 2. About 2,500 foot pounds of energy were required to complete this weld. This energy was obtained from a flywheel 39, which with shaft 35 and chuck 34, had a moment of inertia of 4.85 slug-in$^2$. Motor 40 was activated to rotate chuck 34 and flywheel 39 at 3,600 r.p.m. and clutch 41 was then disengaged. Cylinders 37 were then activated to force the workpieces 30 and 33 together with a pressure of from 10,000 to 20,000 pounds per square inch in the weld area. The weld was completed in 0.4 second.

The pressure in making this weld may vary from 5,000 to 40,000 pounds per square inch, but the best results are obtained with a pressure from 10,000 to 20,000 pounds per square inch.

Welds can be made with the energy put into the weld varying from 2,500 foot pounds per square inch of weld area to 25,000 foot pounds per square inch of weld area, but the greater amount of energy may result in too much upset for a given weld. Moreover, this energy should be delivered to the weld area in less than ten seconds, preferably in two seconds or less. The initial average relative speed of the workpieces should be at least 2 feet per second so the energy can be delivered to the weld area in a short enough time to prevent excessive heat losses. In addition, slower relative surface speeds may result in chatter and the galling of the workpieces rather than smooth heat generation.

While this invention has been shown and described in the best forms known, it will nevertheless be understood that these are purely exemplary and that modifications may be made without departing from the spirit of the invention except as it may be more limited in the appended claims.

What is claimed is:

1. The method of friction welding titanium and titanium alloy workpieces comprising the steps of rotating the workpieces relative to each other with an average relative surface speed of at least two feet per second, forcing the relatively rotating workpieces together with a force of 100 to 1,500 pounds per square inch of weld area for from one to ten seconds, rapidly stopping the relative rotation of the workpieces, and forcing the workpieces together with a force of at least 5,000 pounds per square inch of weld area to complete the weld.

2. The method according to claim 1, wherein the workpieces are forced together with a force of over 10,000 pounds per square inch of weld area to complete the weld.

3. The method of friction welding titanium and titanium alloy workpieces comprising the steps of imparting rotation to one workpiece coupled to a flywheel and storing energy therein, and forcing the workpieces together, for a period of less than ten seconds, while rotating the workpieces relative to each other at an average surface speed of at least two feet per second, with a force of from 10,000 to 20,000 pounds per square inch of weld area to stop the relative rotation of the workpieces and complete the weld as the rotating workpiece and flywheel deliver from 2,500 to 25,000 foot pounds of energy per square inch of weld area to the weld area.

4. The method according to claim 3 in which the workpieces are forced together with a force of from 5,000 to 40,000 pounds per square inch of weld area.

5. The method according to claim 3 in which the weld is completed in less than two seconds.

References Cited

UNITED STATES PATENTS

| 2,946,119 | 7/1960 | Jones et al. | 29—497.5 X |
| 3,070,880 | 1/1963 | Davis et al. | 29—497.5 X |
| 3,134,169 | 5/1964 | Hollander et al. | 29—470.3 |
| 3,134,278 | 5/1964 | Hollander et al. | 29—470.3 |

JOHN F. CAMPBELL, Primary Examiner